March 1, 1932.         G. C. THOMAS, JR         1,847,147

PIPE COUPLER

Filed April 19, 1930

Inventor
GEORGE C. THOMAS JR

By his Attorney
John M. Montstream

Patented Mar. 1, 1932

1,847,147

UNITED STATES PATENT OFFICE

GEORGE C. THOMAS, JR., OF ELIZABETH, NEW JERSEY, ASSIGNOR TO THE THOMAS & BETTS CO., OF ELIZABETH, NEW JERSEY, A CORPORATION OF NEW JERSEY

PIPE COUPLER

Application filed April 19, 1930. Serial No. 445,579.

This invention relates to pipe couplers adapted to couple conduit pipes together at an angle, say for example at right angles with each other.

An object of the invention is to construct a pipe coupler of two separable parts made in a characteristic or novel way, one of which secures the ends of two conduits together at an angle with each other so that the ends of the connected conduits are exposed to the exterior, together with the second part to form a closure or cover for the ends of said pipes without obstructing the passage between said ends of the pipes.

Another object is to construct a coupler of two parts one of which is constructed of a substantially rectangular piece of sheet metal having a single bend along on axis between its ends and having openings for the reception of conduit pipe and a second member forming a removable closure for the coupling.

The invention will be more apparent from the following description taken in connection with the accompanying drawings in which.

The coupler of this invention consists of two separable parts one of which is adapted to receive the ends of electrical conduit piping so that the ends of the pipes are exposed to view and in communication for the passage of wire from one pipe into the other, and the other part being a removable closure or cover which encloses the open sides of the coupler. The cover may also be described as forming the remaining sides of the coupler. After the wire or wires have been run through the conduit pipes, the cover is mounted over the conduit anchorage member and may be clamped thereto forming a complete closure for the coupler yet permitting access to the interior of the coupler and the conduit pipe ends with the wire passing therethrough merely by removing the cover.

The coupler consists of a pipe anchorage member 10, which in its preferred form is nothing more than an angle plate, bent along an axis 11 providing two faces of the pipe anchorage member extending substantially at right angles to each other. It is clear that these two faces need not necessarily be at right angles to each other but may be at any angle depending upon the angle desired between the axis of the conduit pipes P so that the angle of the two faces may be greater or less than 90°. Usually, however, the conduit pipes coupled together by a coupler extend at right angles to each other.

Figure 1:
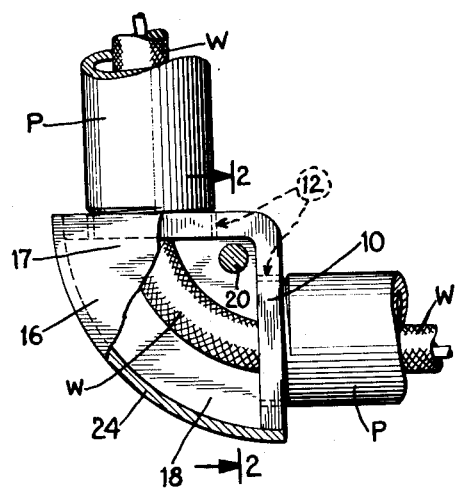
Figure 1 shows the pipe coupler to which conduit pipes are anchored at right angles to each other with a portion of the removable cover cut away exposing the interior thereof.
Figure 3:
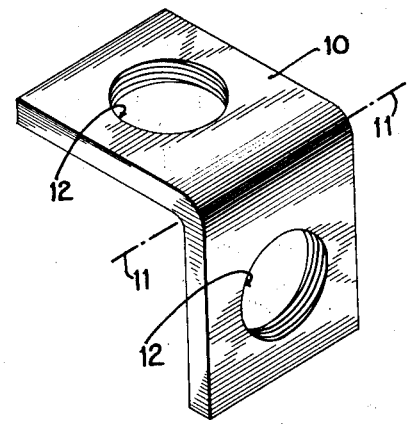
Figure 3 shows the conduit receiving member of the two piece coupler in perspective.
Figure 2:
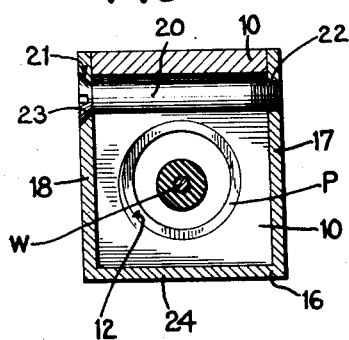
Figure 2 is a section of the pipe coupler on line 2—2 of Figure 1 through the removable closure clamping means.
Figure 4:
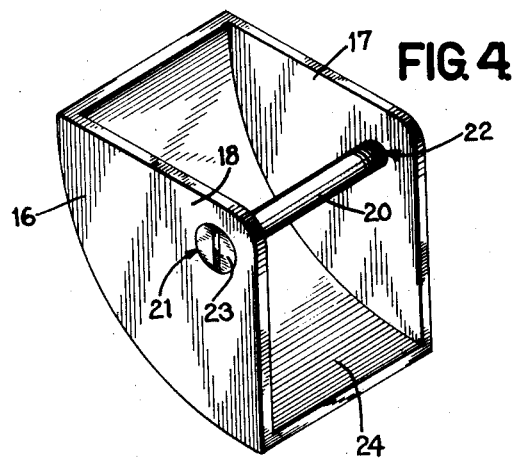
Figure 4 is a perspective view of the closure or cover member with its clamping means for clamping or anchoring the cover securely to the conduit receiving member.

An opening 12 is provided in each face of the pipe anchorage member 10 for the insertion and anchorage of the conduit pipe P therein. The openings 12 may be threaded to receive the threaded end of the conduit pipes shown in Figure 1 or the openings may be smooth so that the conduit may be anchored to the pipe anchorage member 10 by means of the conventional threaded anchorage nuts upon the pipe which is not shown but is very well known to the art. The latter construction of course is preferable where the pipe anchorage member 10 is constructed of relatively thin material which does not offer sufficient thickness to obtain enough screw threads to securely anchor the conduit pipes in the opening.

The pipe anchorage member 10 is shown having two openings for anchoring conduit pipes thereto, but it is to be understood that it is within the scope of this invention to provide more than one such opening in each face for anchoring additional conduit pipes to the pipe anchorage member which openings may take any position relative to the openings shown. That is, the pipe anchorage member 10 may be wider than shown in the drawings in which case the additional openings 12 in each face may be the same distance from the axis 11 or one or both of the faces may be lengthened in which case one opening would be adjacent to the axis 11 and the other pipe anchorage opening in the same face would be distant from the axis 11.

The second member forming the removable cover 16, which numeral designates the cover as a whole, is adapted to completely enclose the open sides of the pipe anchorage member 10 thereby completing an entirely enclosed coupler. This cover 16 is adapted to fit over the pipe anchorage member 10 and be retained in position thereupon. The cover 16 therefore comprises substantially two parallel sides connected together by a third side which may be a single straight side, a curved side 24, as shown in the drawings, or may take any desired form or shape so long as it forms a complete or substantially complete closure for the coupler. It will be observed that the cover is practically a U-shaped member. The closure or cover 16 preferably is constructed so that the sides 17 and 18 are substantially parallel and flexible. The cover 16 may be retained in assembled position upon the pipe anchorage member 10 by utilizing the flexibility of the parallel sides to clamp the pipe anchorage member therebetween. With such clamping means the flexible faces 17 and 18 are snapped into position upon the pipe anchorage member.

In the preferred construction, however, a more positive anchorage or clamping means for the cover 16 is utilized. In this construction a clamping screw 20 extends through a hole 21 in one of the flexible sides, such as the side 18 of the cover 16, and is threaded into the other flexible side 17 through the threaded opening 22. The opening 21 is countersunk to receive the countersink head 23 of the screw 20. Upon tightening of the clamping screw 20, when the cover is upon the pipe anchorage member 10, the flexible sides 17 and 18 of the cover member 16 are drawn together and firmly clamp upon the edges of the pipe anchorage member 10. The cover may be removed by unscrewing the screw 20 which permits the flexible sides 17 and 18 to expand thereby releasing or unclamping the cover 16 from the pipe anchorage member 10.

The clamping screw 20 is positioned upon the cover 16 so that when assembled with the pipe anchorage member 10, the screw 20 fits into the corner of the pipe anchorage member and does not obstruct the openings 12 to and from the conduit pipe P. Although this screw is shown as being positioned so that it extends within the assembled coupler and in the corner of the angle plate 10, it is within the scope of this invention to position the clamping screw 20 so that it is outside of the coupler when assembled and yet draws together the flexible sides 17 and 18 of the cover 16 to clamp the cover upon the angle plate.

In assembling the coupler the pipes P are threaded into the openings 12 in the pipe coupler member or otherwise anchored therein and the wire W may then be drawn through the pipes. The open ends of the pipe render it extremely simple to pull the end of the wire from one pipe and project it into the other pipe. The cover member 16 is then projected over the edges of the pipe anchorage member 10 after which the clamping screw 20 is inserted through the opening 21 and threaded into the opening 22 in the sides 18 and 17 of the cover 16 and tightened, which draws the flexible sides 17 and 18 together and firmly clamps it upon the pipe anchorage member 10.

The coupler shown in the drawings is provided with openings 12 which serve as wire passages through which the wire carried in the conduit pipe is projected or extended into the coupler and the threads in the openings 12 provide conduit pipe anchorage means whereby a conduit is firmly anchored to the angle plate. Although the drawings show the wire passage and the pipe anchorage means substantially as a unitary structure by the threaded opening 12, it is obvious that the wire passages and the pipe anchorage means may be separate and distinct from each other and they need not be a substantially unitary structure as shown to be within the scope of the invention.

The coupler therefore consists of a separable two part device in which one of the members provides two sides in which conduit pipes are anchored and thereby leaving three sides open or exposed to reach the interior of the coupler and also the conduit pipe ends and the other member provides at least three sides of the coupler whereby a completely enclosed coupler results when the two parts are assembled together. Furthermore, the coupler described herein may be constructed so that more than two pipes may be coupled together without deviating from the invention.

Having described my invention it is to be understood that the invention is not to be limited to the specific disclosure in the drawings or the description in the specification as to details of the construction but is to be limited only as set forth in the accompanying claims.

What I claim is:

1. A pipe coupler comprising a rectangular member of relatively thick sheet material bent to form two sides of the coupler, the inner and exterior surfaces of the member being smooth, said member having openings therethrough to receive electrical conduit, and a removable cover attachable on the member enclosing the open sides of the coupler.

2. A pipe coupler comprising a rectangular member of relatively thick sheet material bent to form two sides of the coupler, the inner and outer surfaces of the member being smooth, said member having threaded openings therethrough carrying a plurality of threads to receive a plurality of threads upon the end of an electrical conduit, a removable cover for enclosing the open sides thereof, and means to anchor the removable cover onto the member.

3. A pipe coupler comprising an angular member forming two sides of the coupler, said member having openings therethrough to receive electrical conduit, a removable cover attachable on the member enclosing the open sides thereof, said cover having two parallel flexible sides between which the member is inserted, and a screw engaging the parallel flexible sides and passing through the coupler within the angle of the member to draw them together to clamp the cover upon the member along the entire length of the edges thereof.

4. A pipe coupler comprising an angle plate formed by bending a flat rectangular sheet along a single axis between its ends, said angle plate having substantial thickness and having threaded openings therethrough with a plurality of threads providing pipe anchorage means, a substantially U-shaped cover having flexible parallel sides and a rounded side joining the flexible sides together, and a screw carried by the cover and positioned within the coupler adjacent to and within the bend in the angle plate to draw the flexible sides together to clamp the cover upon the entire length of the edges of the angle plate.

In testimony whereof I affix my signature.

GEORGE C. THOMAS, Jr.